US009229579B2

(12) United States Patent
Su et al.

(10) Patent No.: US 9,229,579 B2
(45) Date of Patent: Jan. 5, 2016

(54) OPTICAL TOUCH SYSTEM

(75) Inventors: Tzung Min Su, Hsinchu (TW); Yi Hsien Ko, Hsinchu (TW); Yu Chia Lin, Hsinchu (TW); Chih Hsin Lin, Hsinchu (TW)

(73) Assignee: Pixart Imaging Inc., Hsin-Chu (TW)

(*) Notice: Subject to any disclaimer, the term of this patent is extended or adjusted under 35 U.S.C. 154(b) by 172 days.

(21) Appl. No.: 13/606,942

(22) Filed: Sep. 7, 2012

(65) Prior Publication Data
US 2013/0063402 A1 Mar. 14, 2013

(30) Foreign Application Priority Data

Sep. 9, 2011 (TW) .............................. 100132560 A

(51) Int. Cl.
*G06F 3/042* (2006.01)
*G06F 3/0488* (2013.01)

(52) U.S. Cl.
CPC .............. *G06F 3/042* (2013.01); *G06F 3/0421* (2013.01); *G06F 3/0488* (2013.01); *G06F 2203/04104* (2013.01); *G06F 2203/04808* (2013.01)

(58) Field of Classification Search
CPC combination set(s) only.
See application file for complete search history.

(56) References Cited

U.S. PATENT DOCUMENTS

| 4,782,328 A * | 11/1988 | Denlinger | G01S 5/16 250/221 |
| 7,689,381 B2 * | 3/2010 | Lin | G06F 3/0428 178/18.09 |
| 8,576,200 B2 * | 11/2013 | Zhu | G06F 3/038 345/175 |
| 2008/0165147 A1 | 7/2008 | Christie et al. | |
| 2008/0309632 A1 * | 12/2008 | Westerman | G06F 3/038 345/173 |
| 2009/0044988 A1 | 2/2009 | Chang et al. | |
| 2009/0090569 A1 * | 4/2009 | Lin | G01D 5/28 178/18.09 |
| 2009/0273571 A1 * | 11/2009 | Bowens | G06F 3/03547 345/173 |
| 2010/0201639 A1 * | 8/2010 | Huang | G06F 3/0428 345/173 |
| 2011/0122099 A1 | 5/2011 | Zhu et al. | |

FOREIGN PATENT DOCUMENTS

| CN | 102033656 A1 | 4/2011 |
| CN | 102033660 A | 4/2011 |
| CN | 102122350 A | 7/2011 |
| TW | 201030579 A | 8/2010 |
| TW | 201030579 A1 | 8/2010 |
| TW | 201104533 A | 2/2011 |
| TW | 201112091 A | 4/2011 |

OTHER PUBLICATIONS

Office Action from Taiwan, Republic of China, Patent Office in a corresponding Patent Application No. 100132560 dated Mar. 11, 2014, 11 pages in Chinese.

(Continued)

*Primary Examiner* — Gerald Johnson
*Assistant Examiner* — Robert Michaud
(74) *Attorney, Agent, or Firm* — Juan Carlos A. Marquez; Bacon & Thomas PLLC

(57) ABSTRACT

An optical touch system includes an image sensor for detecting at least one object and a processor coupled to the image sensor. The processor is configured to determine the number of pixel clusters created by the at least one object on an image generated from the image sensor and to generate gesture information when the number of pixel clusters is greater than a predetermined pixel cluster number.

34 Claims, 19 Drawing Sheets

(56) References Cited

OTHER PUBLICATIONS

Office Action from People's Republic of China State Intellectual Property Office in the corresponding Chinese Application 201110284335.7 dated Mar. 25, 2015, 19 pp. in Chinese, with 1 page partial English translation.

Search Report from People's Republic of China State Intellectual Property Office in the corresponding Chinese Application 201110284335.7 dated Mar. 25, 2015, 3 pp. in Chinese.

* cited by examiner

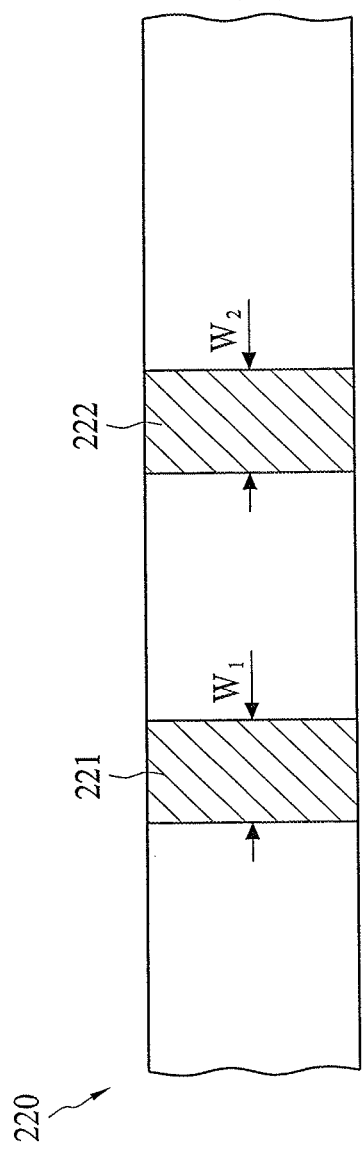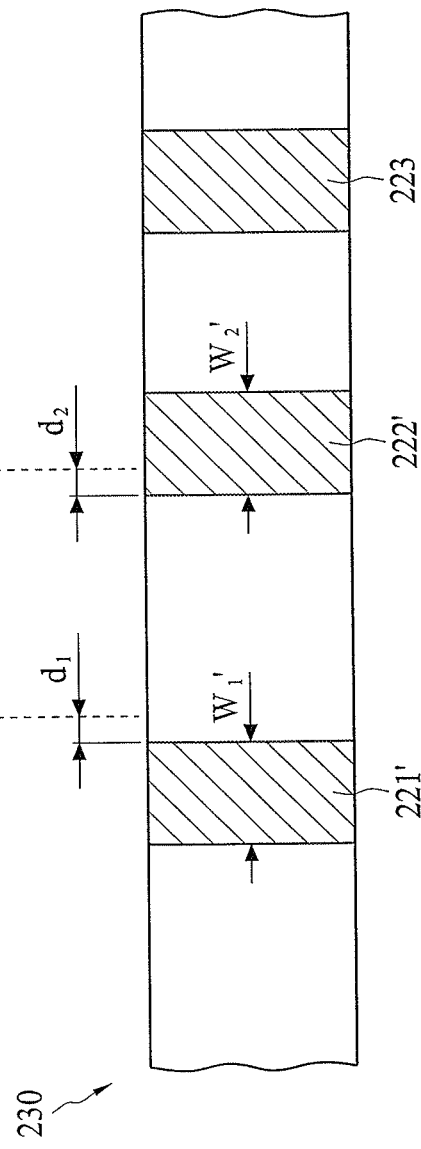

OPTICAL TOUCH SYSTEM

CROSS-REFERENCE TO RELATED APPLICATION

The present application is based on, and claims priority from, Taiwan Patent Application Serial Number 100132560, filed on Sep. 9, 2011, the disclosure of which is hereby incorporated by reference herein in its entirety.

BACKGROUND

1. Technical Field

The present invention relates to an optical touch system, and more particularly, to a method of detecting a gesture and an optical system using the same.

2. Related Art

In an optical touch screen system, the method of calculating the position of an object is to use an image sensor to generate a picture, analyze the location of an object image in the picture, and calculate the coordinates of the object by the location of the object image in the picture and a portion of geometric dimensions of the optical touch screen system.

U.S. Pat. No. 4,782,328 discloses an optical touch screen system, which comprises two image sensors and a processor coupled with the two image sensors. The two image sensors are configured to capture the image of an object on a touch screen. The processor is configured to decide sensing paths respectively connecting the object and the two image sensors, and further to calculate the coordinates of the object using the sensing paths.

U.S. Pat. No. 7,689,381 B2 discloses another optical touch screen system, which comprises a mirror, an image sensor, and a processor. The mirror is disposed at the periphery of a touch area. The mirror generates a reflection of an object. The image sensor captures an image of the object and an image of the reflection. The processor determines a sensing path passing through the image of the object and a sensing path passing through the image of the reflection, and determines the coordinates of the object by using the two sensing paths.

Multi-touch technology can simultaneously recognize the presence of two or more objects on a touch surface. This plural-point awareness is often used to implement advanced functionality such as a pinch to zoom or activating predefined programs.

Current optical touch systems use the multi-touch technology to calculate the coordinates of plural objects at each predetermined time and send the coordinates of the objects calculated at different times to multi-touch applications. Multi-touch applications are designed with predefined gestures. Common gestures may include a pan gesture that uses a single finger or multiple fingers to perform scrolling, rotate, and zoom gestures. In addition, a single finger gesture such as a press and tap, flick, press, and drag gesture is also used frequently. Moreover, another common gesture is a double-tap gesture, which can be customized by specific software to perform a particular function: for example, to start a game.

Multi-touch applications can adopt an event driven model as their basic conceptual designs. After a computing system captures a touch event, a registered event handler is called to implement a desired functionality.

During multi-touch operations, current optical touch systems supporting a multi-touch have to calculate coordinates of multiple objects at different time points and to output the coordinates of the objects to the multi-touch applications. The calculation and output of the coordinates of the objects take much time and consume a lot of resources, resulting in slow response of the optical touch systems.

SUMMARY

One embodiment of the present invention provides an optical touch system, which comprises an image sensor and a processor. The image sensor is configured to detect at least one object and generates an image. The processor is coupled with the image sensor and configured to determine a number of pixel clusters created by the at least one object on the image. The processor is configured to generate gesture information when the number of pixel clusters is greater than a predetermined pixel cluster number.

Another embodiment of the present invention discloses an optical touch system, which comprises an image sensor and a processor. The image sensor is configured to detect at least one object. The processor is coupled with the image sensor. The processor is configured to determine a number of pixel clusters created by the at least one object on an image and to compare the number of pixel clusters with a predetermined pixel cluster number to determine whether to calculate coordinate data or generate gesture information.

Another embodiment of the present invention discloses an optical touch system, which comprises an image sensor and a processor. The image sensor is configured to detect at least one object and generate a plurality of images. The processor is configured to receive the images, identify a plurality of pixel clusters of each image, and generate control information according to a change between distances; each determined by two of the pixel clusters that are farthest apart from a corresponding one of the images.

Another embodiment of the present invention discloses an optical touch system, which comprises an image sensor and a processor. The image sensor is configured to detect at least one object and generate a plurality of images. The processor is configured to receive the images and identify at least one pixel cluster of each image. The processor is further configured to generate control information when the processor detects a first pixel cluster of one of the images that stays in a predetermined range in another image, and detects a second pixel cluster in the another image.

Another embodiment of the present invention discloses an optical touch system, which comprises an image sensor and a processor. The image sensor is configured to detect at least one object. The processor is configured to identify a plurality of pixel clusters of a first image and a plurality of pixel clusters of a second image. The first image and the second image are generated in sequence. The plurality of pixel clusters of the first image and the plurality of pixel clusters of the second image are at least partially corresponding to each other, wherein the processor is configured to generate gesture information when a number of the pixel clusters of the second image is greater than or equal to a number of the pixel clusters of the first image, and a difference between a size of each pixel cluster of the first image and a size of the corresponding pixel cluster of the second image is less than a threshold value and/or a difference between a position of each pixel cluster of the first image and a position of the corresponding pixel cluster of the second image is less than the threshold value.

To provide a better understanding of the above-described objectives, characteristics and advantages of the present invention, detailed explanation is provided in the following embodiments with reference to the drawings.

BRIEF DESCRIPTION OF THE DRAWINGS

The invention will be described according to the appended drawings in which:

FIGS. 20 and 21 schematically demonstrate an image, wherein the two images are generated in sequence and each includes a plurality of pixel clusters.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

An optical touch system of one embodiment of the present invention is configured to determine whether a multi-touch operation is being carried out by comparing the number of pixel clusters of an image created by an object with a predetermined pixel cluster number. When a single object is used to perform operations, the number of pixel clusters of the image will be equal to the predetermined pixel cluster number such that the optical touch system will calculate coordinate data of the object using the image. Alternatively, when multiple objects are used to perform operations, the number of pixel clusters of the image will be greater than the predetermined pixel cluster number such that the optical touch system will rely on the change in position or number of pixel clusters of plural images to generate corresponding gesture information.

The optical touch system may comprise at least one image sensor configured to detect at least one object. The optical touch system may further comprise a processor that may be coupled with the image sensor. The processor is configured to analyze an image generated by the image sensor, calculate the number of pixel clusters of the image, compare the number of pixel clusters with a predetermined pixel cluster number, and generate gesture information when the number of pixel clusters of an image is greater than a predetermined pixel cluster number.

The predetermined pixel cluster number can be different in different optical touch systems. In one embodiment, the predetermined pixel cluster number can be the number of pixel clusters created by a single object on an image generated by each image sensor.

An embodied design concept of the invention is demonstrated below in different optical touch systems.

Figure 1:
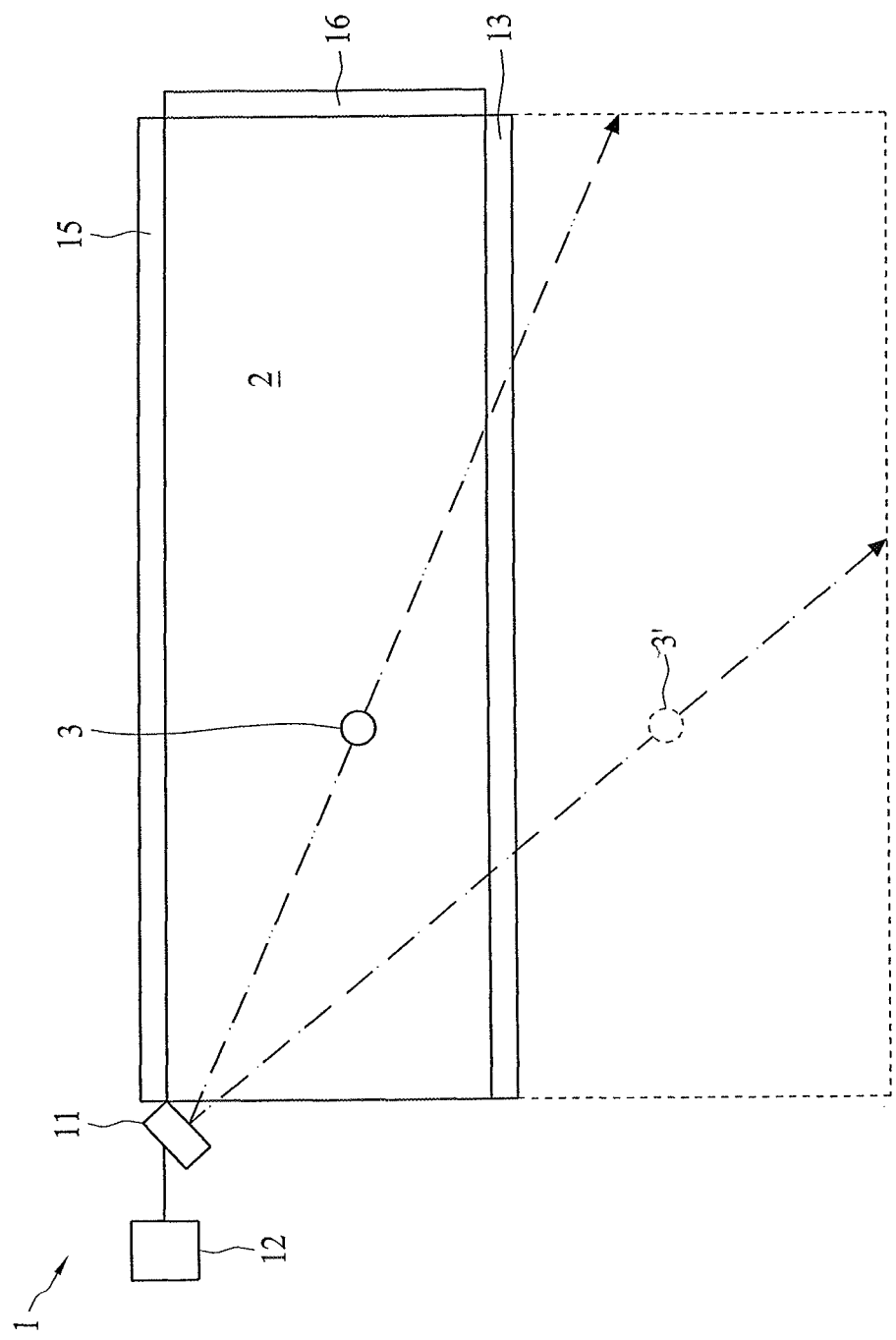
FIG. 1 is an illustration showing an optical touch system according to one embodiment of the present invention.
Figure 2A:
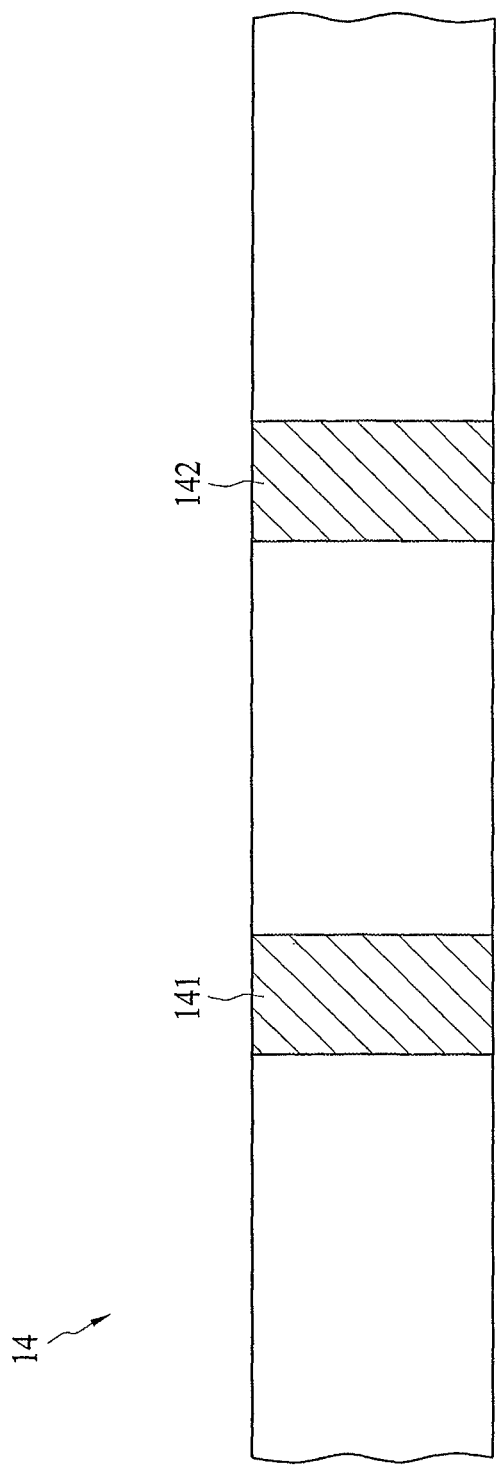
FIG. 2A is an illustration showing an image generated by an image sensor according to one embodiment of the present invention.

FIG. 1 is an illustration showing an optical touch system 1 according to one embodiment of the present invention. FIG. 2A is an illustration showing an image 14 generated by an image sensor according to one embodiment of the present invention. Referring to FIGS. 1 and 2A, the optical touch system 1 may comprise an image sensor 11, a processor 12, and a mirror member 13. The mirror member 13 is disposed adjacent to a touch region 2 to generate a reflection 3' of an object 3. The image sensor 11 can be disposed adjacent to the touch region 2 with its light receiving surface facing toward the touch region 2 for detecting the object 3 on the touch region 2 and the reflection 3' created by the mirror member 13 and generating an image 14 comprising pixel clusters (141 and 142) formed by the object 3 and the reflection 3'. The processor 12 is coupled with the image sensor 11. The processor 12 is configured to determine the number of pixel clusters (141 and 142) formed by the object 3 and the reflection 3' on the image 14 and to compare the number of pixel clusters (141 and 142) with a predetermined pixel cluster number to determine whether to calculate the coordinate data of the object 3 or generate gesture information.

In the present embodiment, the optical touch system 1 is configured with a predetermined pixel cluster number of two. As such, when the number of cluster pixels of an image generated by the optical touch system 1 is two, the optical touch system 1 calculates the coordinate data of the object 3 using the captured image 14. The method for calculating the coordinate data of the object 3 can refer to U.S. Pat. No. 7,689,381 B2, while the present invention is not limited by the method disclosed in U.S. Pat. No. 7,689,381 B2. In one embodiment, a single object 3 can form two pixel clusters in an image 14. Therefore, the predetermined pixel cluster number is accordingly determined as two.

The pixel cluster (141 or 142) is a group of pixels, which have similar intensities that are different from the background intensity. The pixel cluster (141 or 142) can have any shape that is not limited by the shape depicted in FIG. 2A.

Figure 2B:
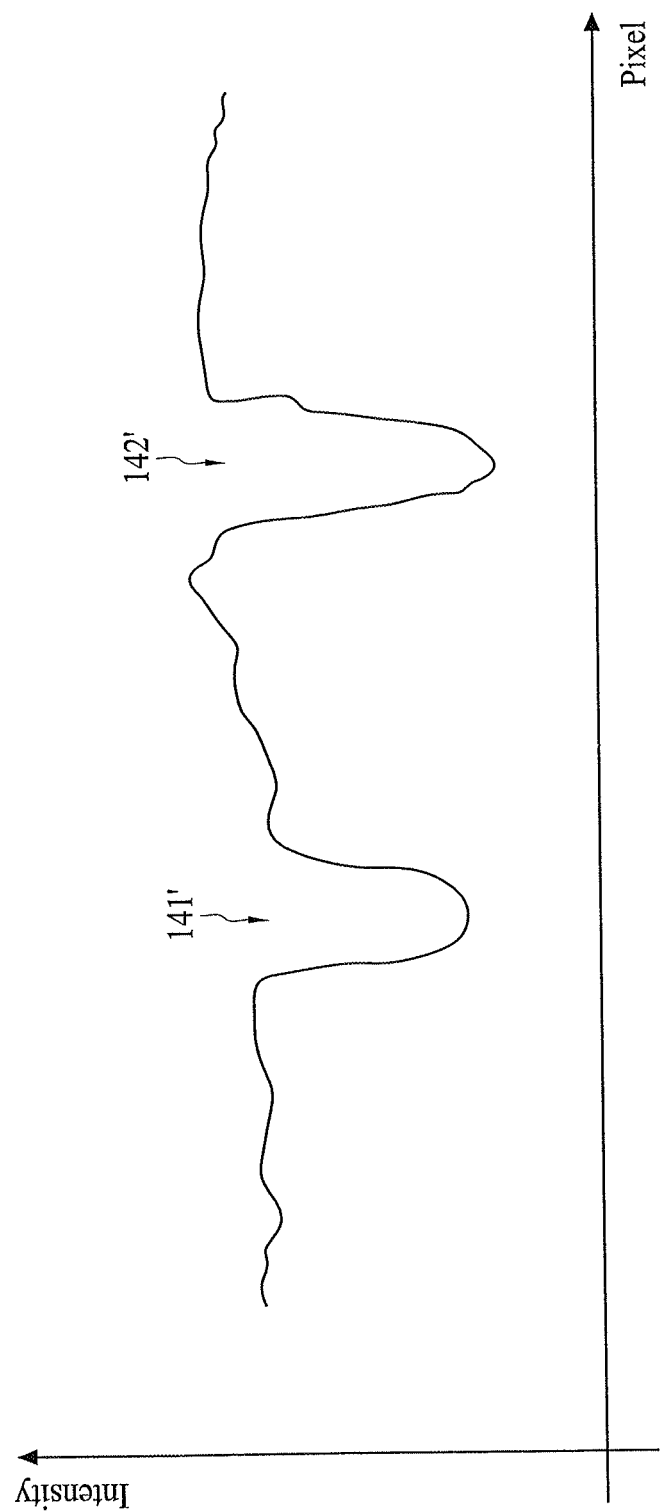
FIG. 2B schematically illustrates/an intensity fluctuating pattern.

Referring to FIGS. 2A to 2D, the processor 12 may use the intensity information of at least one portion of pixels to generate an intensity fluctuating pattern as shown in FIG. 2B, and then identify the pixel cluster (141 or 142) from the intensity fluctuating pattern.

If the pixel cluster (141 or 142) of the image 14 is formed due to the block of light by the object 3, then the intensity fluctuating pattern will show a corresponding portion (141' or 142') with a low intensity. Alternatively, if the pixel cluster (141 or 142) of the image 14 is formed due to the reflection of light by the object 3, the intensity fluctuating pattern will show a corresponding portion with a high intensity.

In one embodiment, the processor 12 is configured to use a default threshold value or a brightness variation threshold to identify the portion with a low or high intensity. Therefore, the pixel cluster (141 or 142) can be easily determined.

The intensity fluctuating pattern can be obtained by many methods. Several common methods are illustrated below, which should not be used to limit the breadth and scope of the present invention.

In one embodiment, an intensity fluctuating pattern can be obtained by calculating a sum or an average of pixel intensity values of each column of the image 14.

Figure 2C:
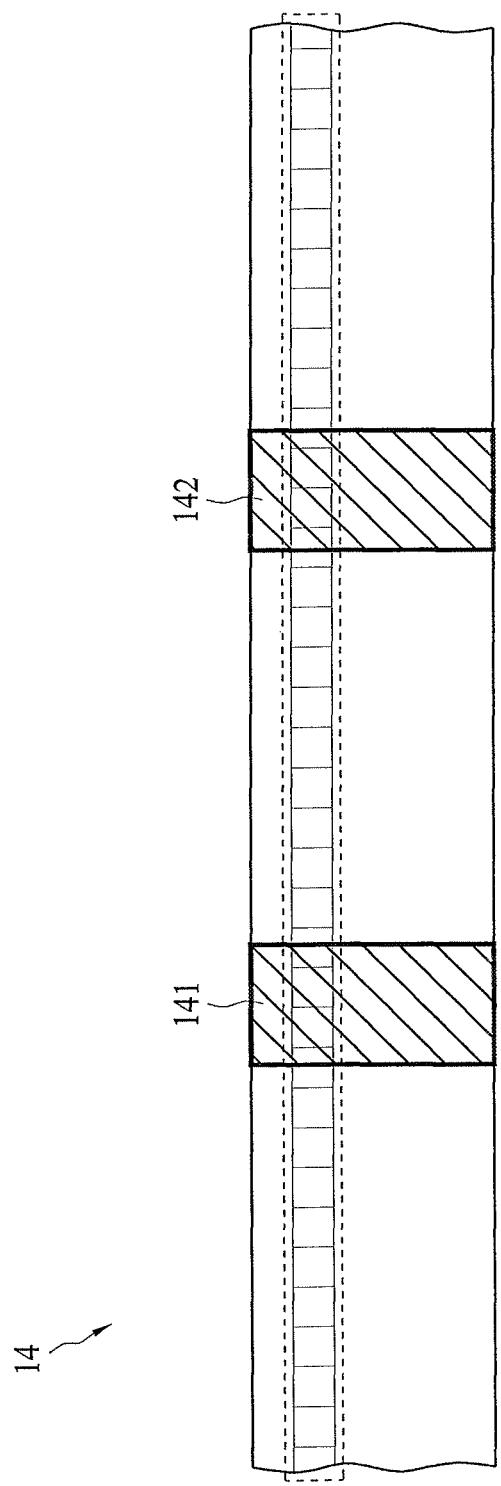
FIG. 2C schematically illustrates a row of pixels selected from an image according to one embodiment of the present invention.

In one embodiment, as shown in FIG. 2C, an intensity fluctuating pattern can be formed by the intensity values of at least one row of pixels. An intensity fluctuating pattern can be a sum or an average of the intensity fluctuating patterns of a plurality of rows of pixel.

Figure 2D:
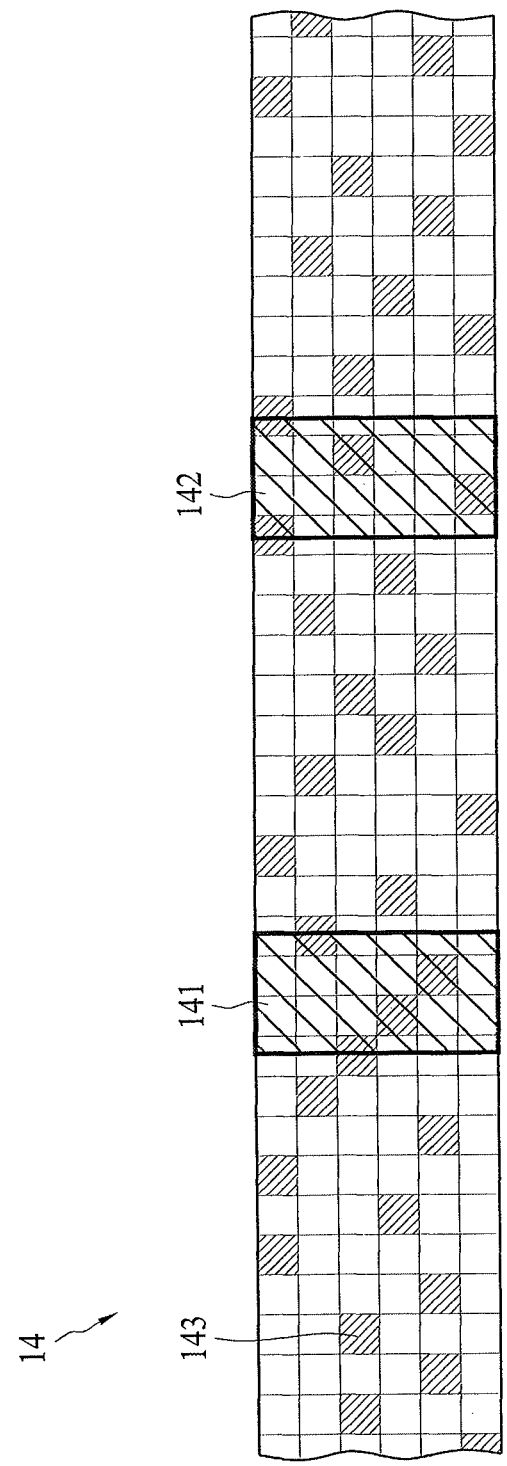
FIG. 2D schematically demonstrates the distribution of selected pixels of an image according to one embodiment of the present invention.

In one embodiment, an intensity fluctuating pattern can be obtained by using pixels 143 that are distributed along a row direction and do not belong to the same row, as shown in FIG. 2D.

In one embodiment, an intensity fluctuating pattern can be determined by using a portion of pixel rows (for example, darkest N pixel rows or brightest N pixel rows) of the image 14, or using the intensities of the darkest N pixels or the brightest N pixels selected from each column of the image 14.

In one embodiment, the object 3 comprises a finger.

Referring back to FIG. 1, in one embodiment, the optical touch system 1 may further comprise two light projecting members (15 and 16), which project light above the touch region 2 for detecting, the object 3. The light projecting members (15 and 16) can be disposed adjacent to the touch region 2.

Figure 3:
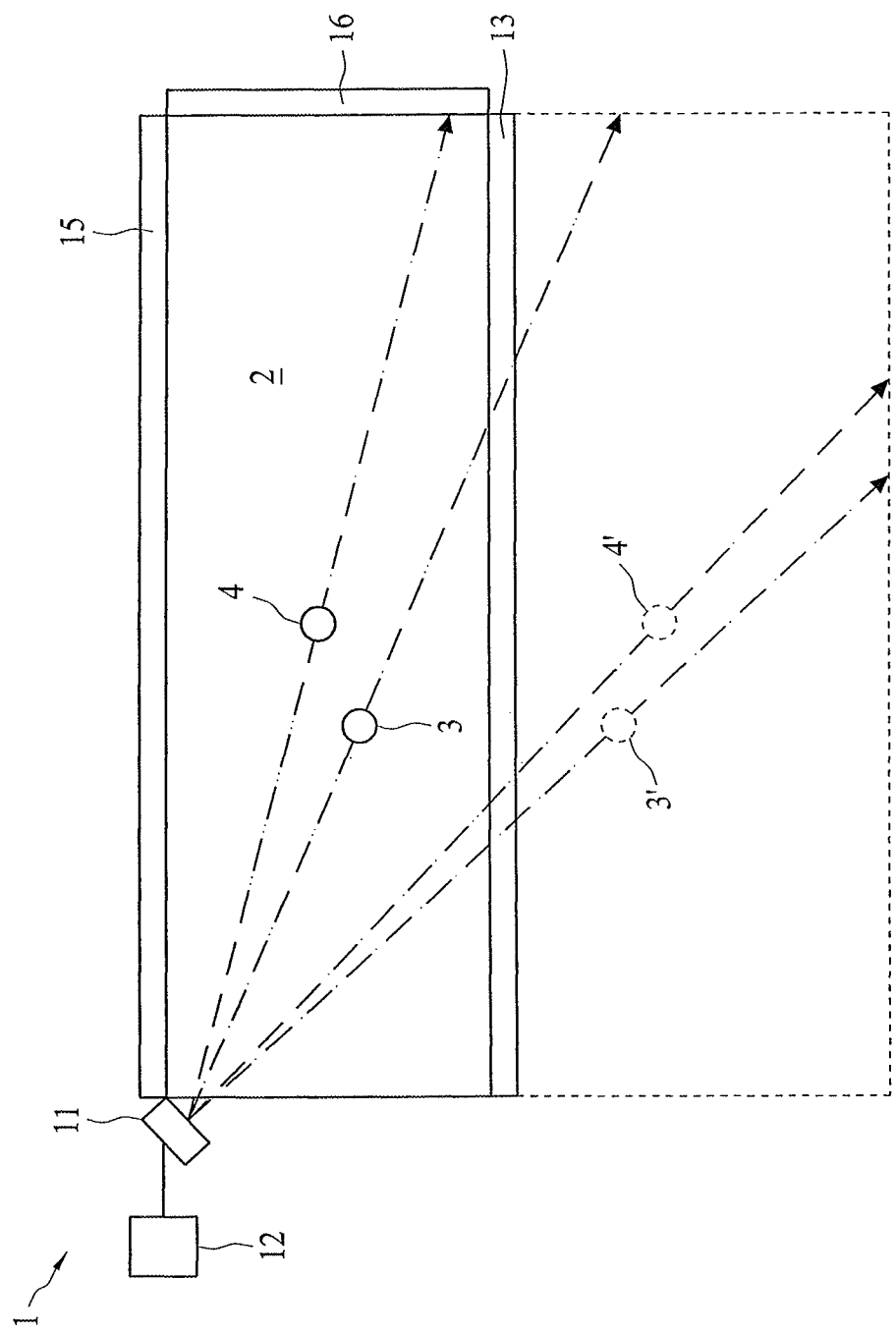
FIG. 3 is an illustration showing two objects in an optical touch system according to one embodiment of the present invention.
Figure 4:
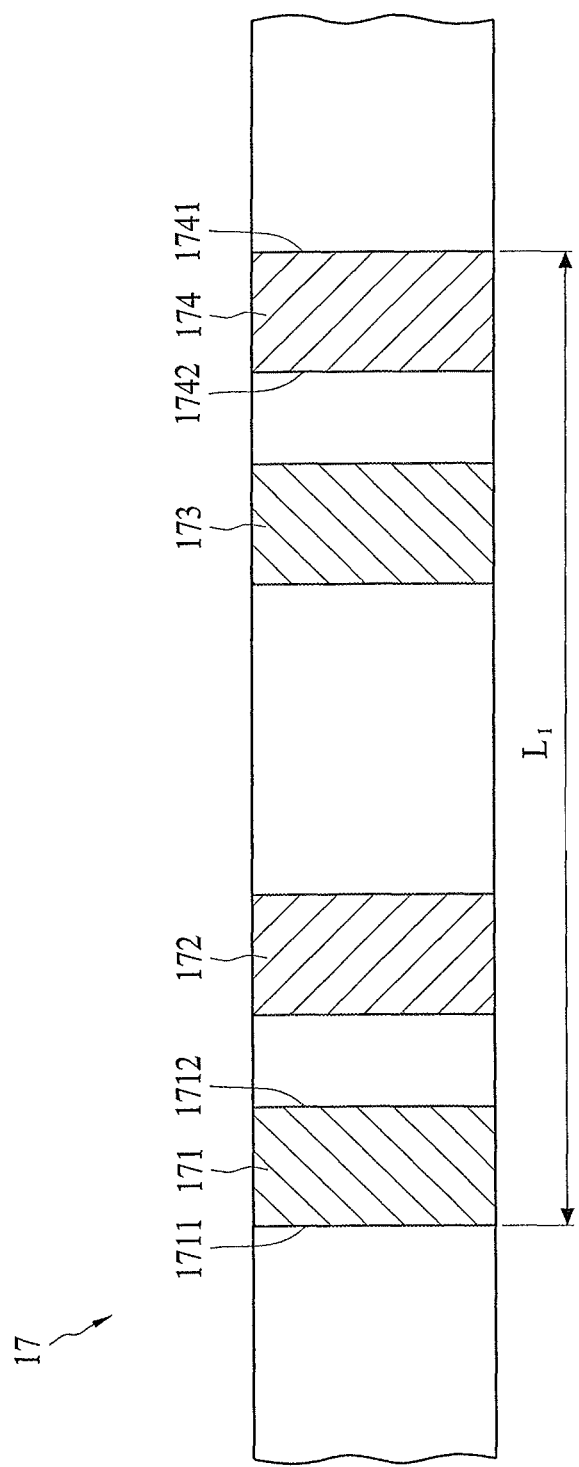
FIG. 4 schematically demonstrates an image with a plurality of pixel clusters formed by the two objects in FIG. 3 according to one embodiment of the present invention.

Referring to FIGS. 3 and 4, when two objects (3 and 4) contact the touch region 2, the mirror member 13 may create two reflections (3' and 4'). At this moment, the image 17 generated by the image sensor 11 may comprise pixel clusters (171, 172, 173 and 174) respectively formed by the objects (3 and 4) and the reflections (3' and 4'). The processor 12 analyzes the image 17 and finds that the image 17 has four pixel clusters (171, 172, 173 and 174). After comparing the number of pixel clusters (171, 172, 173 and 174) with a predetermined pixel cluster number (i.e., two in the present embodiment), the processor will determine a difference between the image 17 and the next image to generate corresponding gesture information.

In one embodiment, the next image is generated at a predetermined sampling time after the image 17 is generated.

Figure 5:
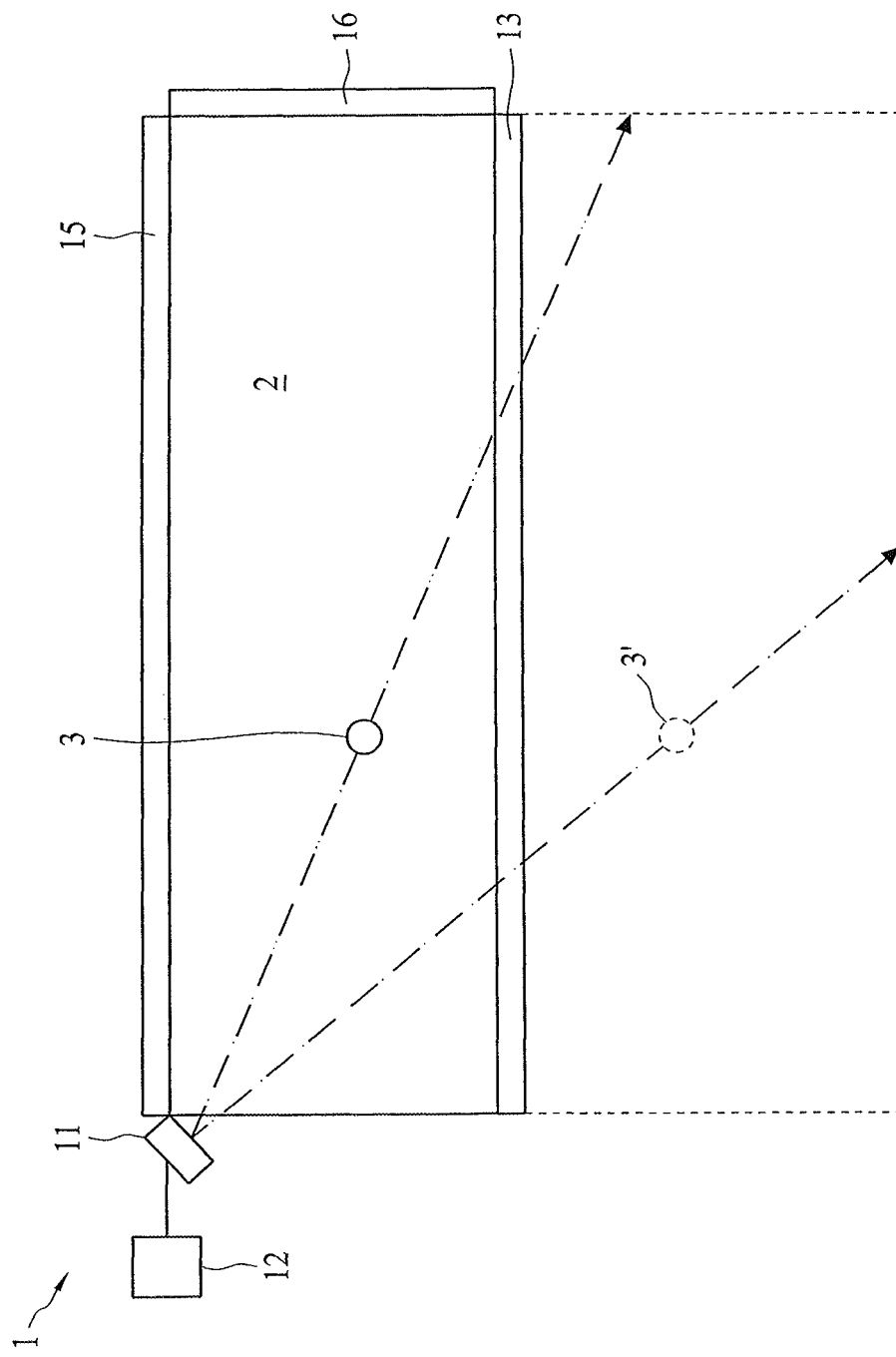
FIG. 5 is an illustration showing an object in an optical touch system according to one embodiment of the present invention.

Referring to FIGS. 3 to 5, after the two objects (3 and 4) contact the touch region 2, the object 4 then moves away from the touch region 2. After the object 4 moves away from the touch region 2, the image sensor 11 generates an image showing two pixel clusters, as shown in FIG. 2A. After comparing the image 17 in FIG. 4 and the next image including two pixel clusters, the processor 12 generates press and tap gesture information with the result of the reduction in the numbers of pixel clusters in the two images. In one embodiment, the press and tap gesture information corresponds to the command generated when a right mouse button is pressed.

In one embodiment, the processor 12 receives a plurality of images and identifies at least one pixel cluster from each image. When the processor 12 detects a first pixel cluster in one of the images that stays in a predetermined range in another image or other images and detects a second pixel cluster in the another image or at least one of other images, the processor 12 generates control information. In one embodiment, when the second pixel cluster that stays in a predetermined range disappears, press and tap gesture information is generated.

Figure 6:
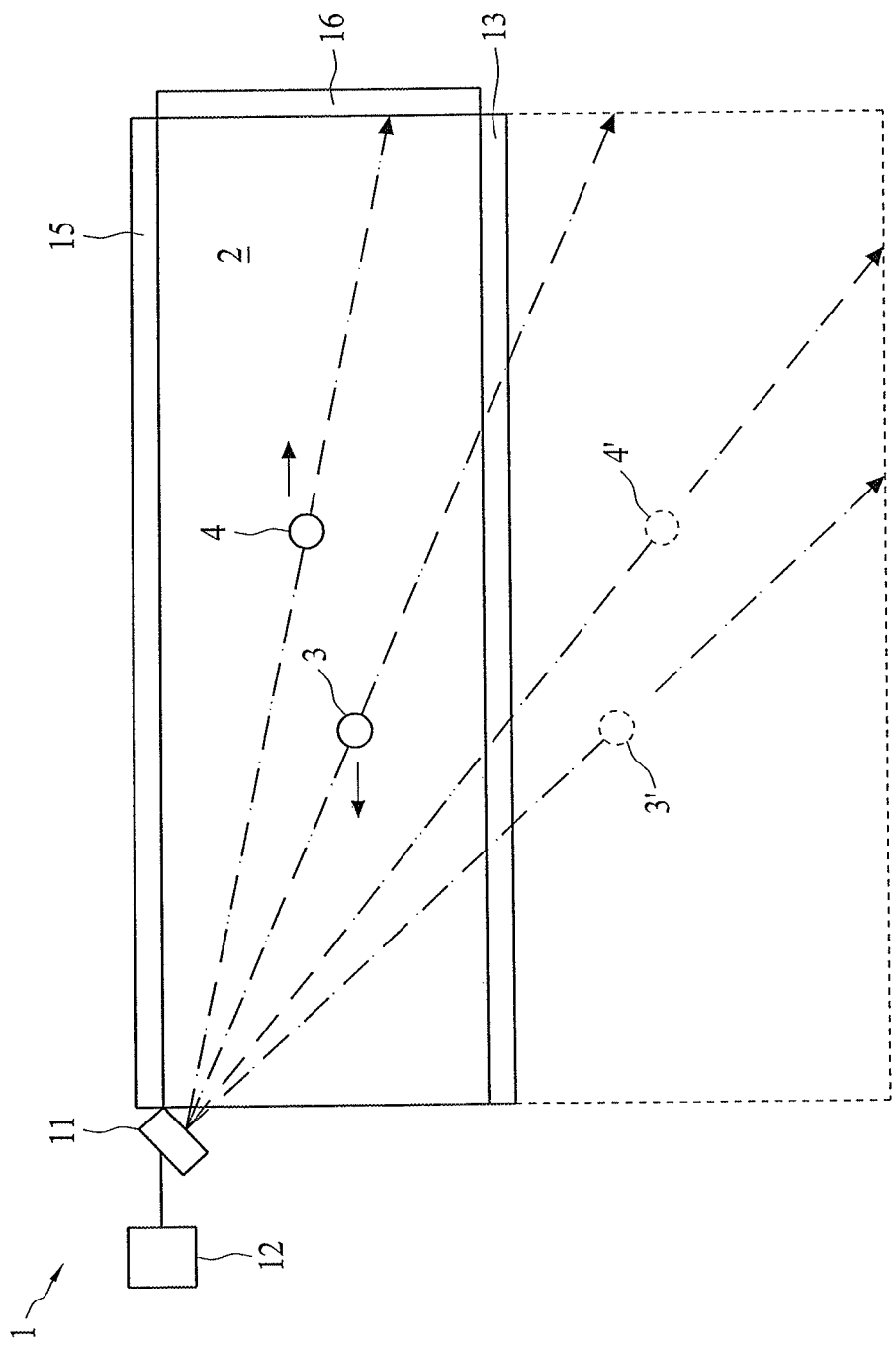
FIG. 6 schematically illustrates two objects moving in an optical touch system according to one embodiment of the present invention.
Figure 7:
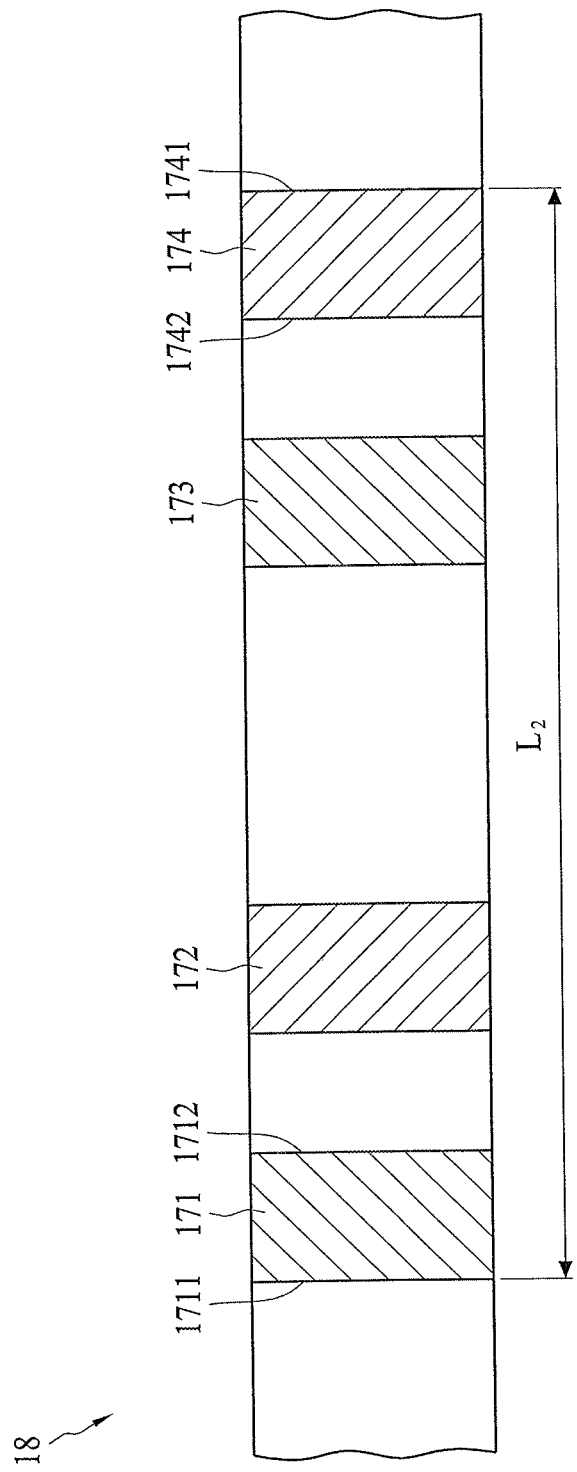
FIG. 7 schematically demonstrates an image with a plurality of pixel clusters formed by the two objects in FIG. 6 according to one embodiment of the present invention.

Referring to FIGS. 3, 4, 6, and 7, after the image 17 is generated, the processor 12 obtains a next image 18 (FIG. 7). The object (3 and 4) on the touch region 2 may move away from each other, as shown in FIG. 6. The image 18 is generated by the image sensor 11 during the separation of the object 3 from the object 4. After receiving the image 18, the processor 12 compares the number of the pixel clusters (171, 172, 173 and 174) of the image 18 with the predetermined pixel cluster number (i.e., two in the present embodiment). Because the number of the pixel clusters (171, 172, 173 and 174) of the image 18 is greater than the predetermined pixel cluster number, the processor 12 next determines a distance $L_1$, from the image 17, between two of the pixel clusters (171, 172, 173 and 174) that are farthest apart and a distance $L_2$, from the image 18, between two of the pixel clusters (171, 172, 173 and 174) that are farthest apart, and determines a change of the two (distance $L_1$ and $L_2$). In the present embodiment, because the two objects (3 and 4) separate from each other, the change of the two distances $L_1$ and $L_2$ indicates an increase; namely, the distance $L_2$ is greater than the distance $L_1$. The processor 12 then generates zoom-in information by the result of the increasing difference between the two distances $L_1$ and $L_2$. In one embodiment, the zoom-in information corresponds to the combination command of holding the control key and rotating mouse scroll wheel forward or up.

The distance ($L_1$ or $L_2$) may be a distance between the edges of the two pixel clusters that are farthest apart or a distance between points representing the two pixel clusters that are farthest apart. In one embodiment, the distance ($L_1$ or $L_2$) may be the distance between the outside edges (1711 and 1741) of the two pixel clusters (171 and 174) that are farthest apart. In one embodiment, the distance ($L_1$ or $L_2$) may be the distance between the inside edges (1712 and 1742) of the two pixel clusters (171 and 174) that are farthest apart. In one embodiment, the distance ($L_1$ or $L_2$) may be the distance between two predetermined points of the outside edges (1711 and 1741) of the most distant two pixel clusters (171 and 174), wherein the predetermined point of the outside edge (1711 or 1741) can be an edge point or a middle point. In one embodiment, the distance ($L_1$ or $L_2$) may be the distance between two predetermined points of the inside edges (1712 and 1742) of the most distant two pixel clusters (171 and 174), wherein the predetermined point of the inside edge (1712 or 1742) can be an edge point or a middle point. In one embodiment, the distance ($L_1$ or $L_2$) may be the distance between the center points of the most distant two pixel clusters (171 and 174). In one embodiment, the distance ($L_1$ or $L_2$) may be the distance between the points of the gravity of the most distant two pixel clusters (171 and 174).

Figure 8:
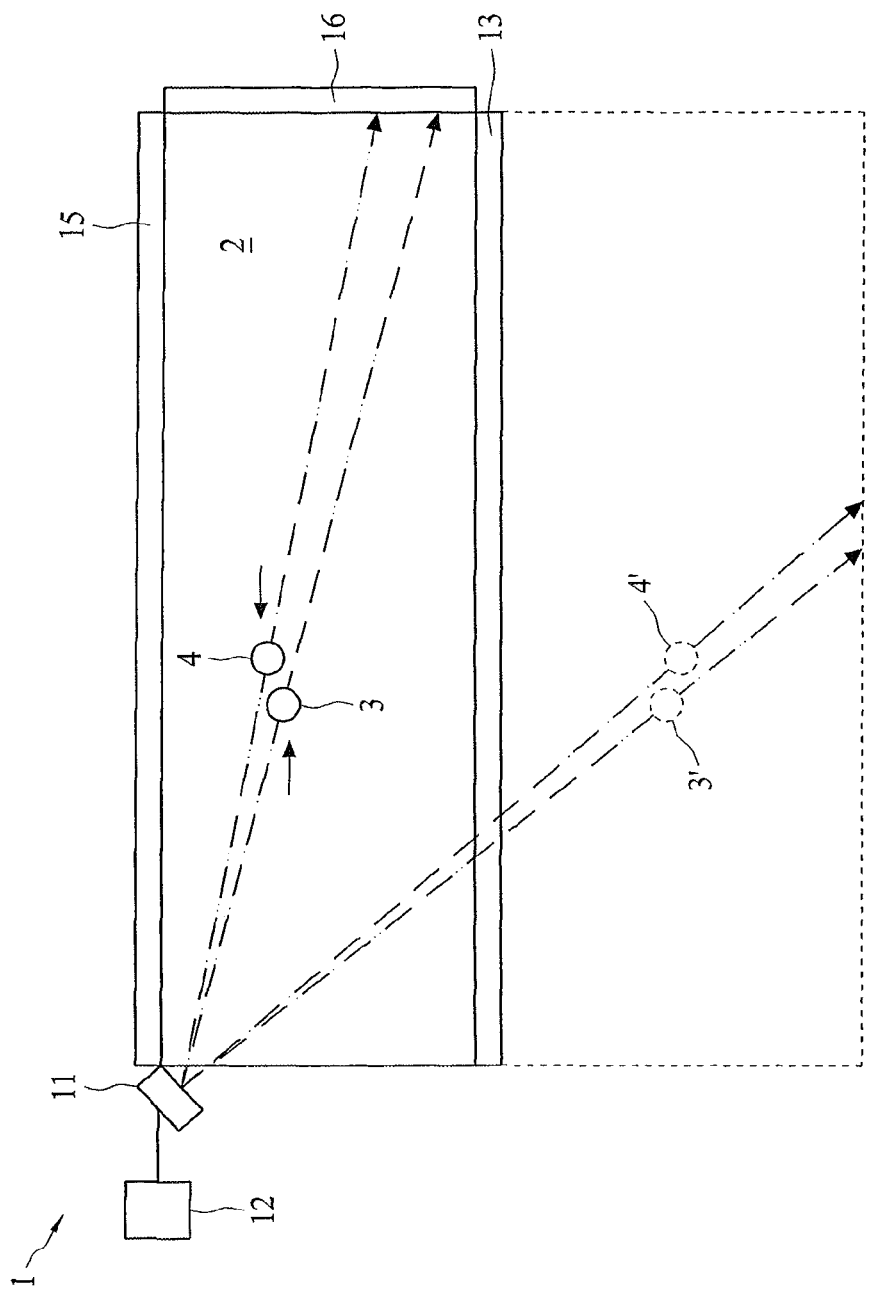
FIG. 8 schematically illustrates two objects moving in an optical touch system according to one embodiment of the present invention.
Figure 9:
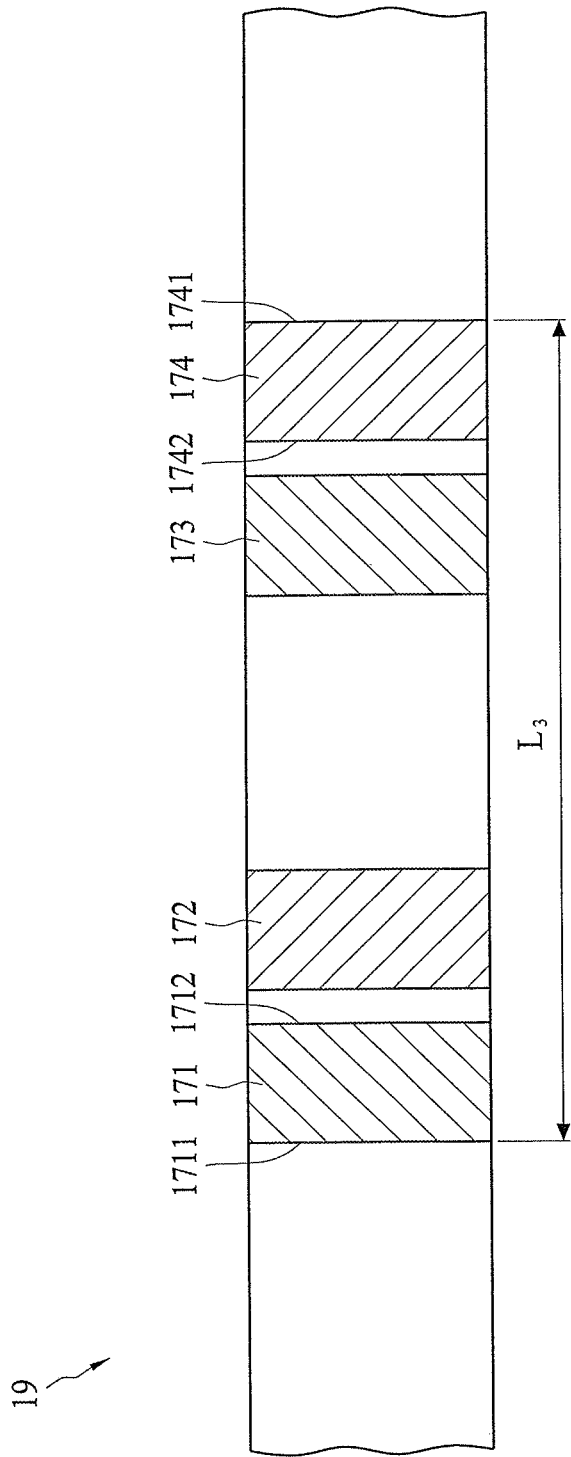
FIG. 9 schematically demonstrates an image with a plurality of pixel clusters formed by the two objects in FIG. 8 according to one embodiment of the present invention.

Referring to FIGS. 3, 4, 8, and 9, after acquiring the image 17, the processor 12 obtains a next image 19 (FIG. 9). The objects (3 and 4) on the touch region 2 may move closer to each other as shown in FIG. 8. The image 19 is generated by the image sensor 11 when the objects (3 and 4) are moving closer to each other. After receiving the image 19, the processor 12 compares the number of the pixel clusters (171, 172, 173 and 174) of the image 19 with the predetermined pixel cluster number (i.e., two in the present embodiment). Because the number of the pixel clusters (171, 172, 173 and 174) of the image 19 is greater than the predetermined pixel cluster number, the processor 12 next determines a distance $L_1$ between the most distant two of the pixel clusters (171, 172, 173 and 174) of the image 17 and a distance $L_3$ between the most distant two of the pixel clusters (171, 172, 173 and 174) of the image 19, and determines a change of the two distances ($L_1$ and $L_3$). In the present embodiment, because the two objects (3 and 4) move closer to each other, the change of the two distances $L_1$ and $L_3$ indicates a decrease; namely, the distance $L_3$ is less than the distance $L_1$. The processor 12 then generates zoom-out information by the result of the decreasing difference between the two distances $L_1$ and $L_3$. In one embodiment, the zoom-out information corresponds to the combination command of holding the control key and rotating the mouse scroll wheel backward or down.

Figure 10:
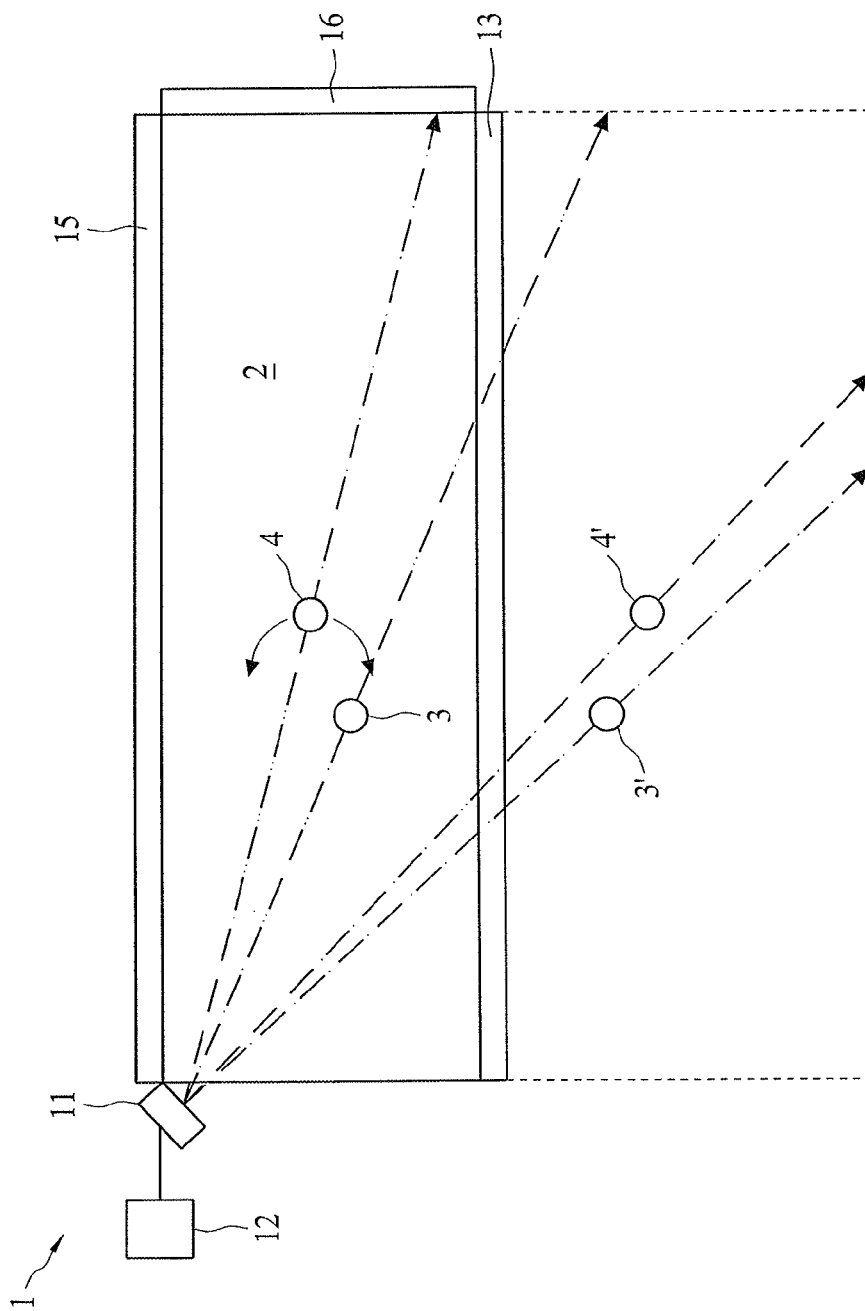
FIG. 10 schematically illustrates two objects performing a rotation gesture in an optical touch system according to one embodiment of the present invention.
Figure 11:
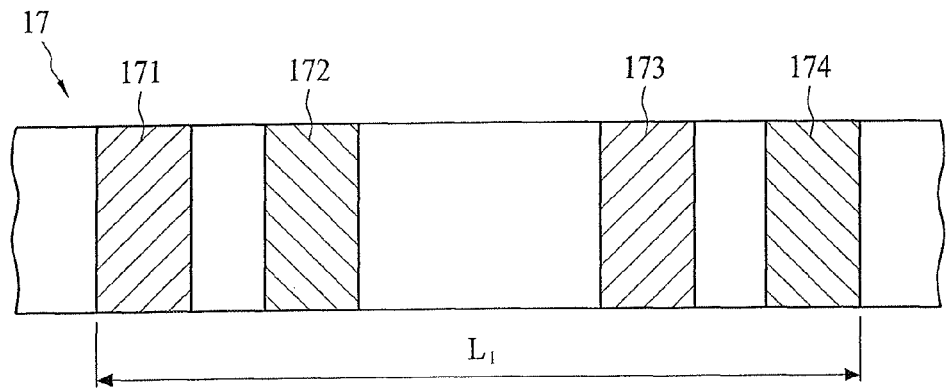
FIGS. 11 to 13 schematically demonstrate the change in position among pixel clusters of images created by the objects of FIG. 10 that performs a rotation gesture according to one embodiment of the present invention.
Figure 12:
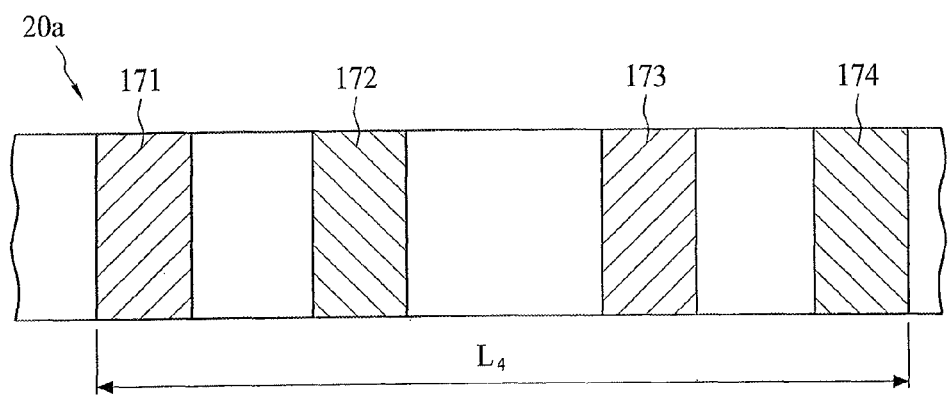
Figure 13:
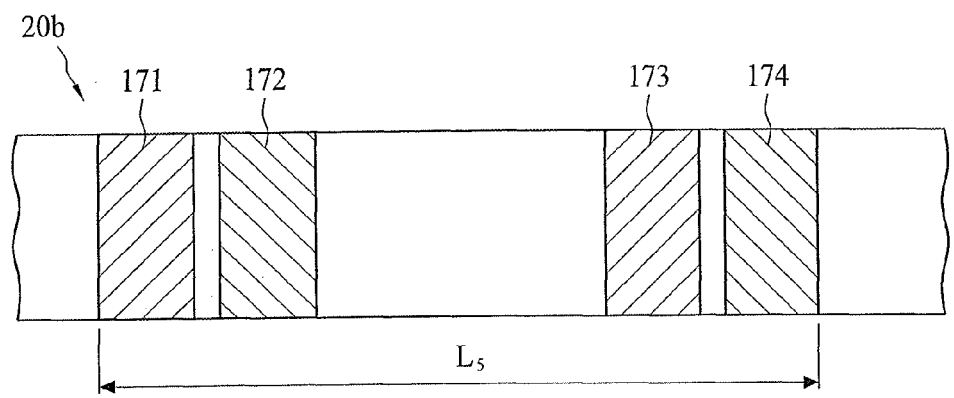

Referring to FIGS. 10 to 13, the objects (3 and 4) on the touch region 2 may do a rotation gesture. For example, the object 4 may move around the object 3 clockwise or counterclockwise as shown in FIG. 10. In the present embodiment, the two objects (3 and 4) forms the pixel clusters (173 and 174) on the image 17 when the two objects (3 and 4) are at the positions shown in FIG. 10. Simultaneously, the reflections (3' and 4') respectively form the pixel clusters (171 and 172) on the image 17. As the position of the object 4 continues to change and the position of the object 3 has not changed, the positions of the pixel clusters (171 and 173) will not change while the positions of the pixel clusters (172 and 174) will continue to change in a series of images.

When the object 3 moves around the object 4, the image sensor 11 generates, in sequence, an image 17 and an image 20a. Because the number of the pixel clusters (171, 172, 173 and 174) is greater than the predetermined pixel cluster number (i.e., two in the present embodiment), the processor 12 calculates a distance $L_1$ between the most distant two (171 and 174) of the pixel clusters (171, 172, 173 and 174) of the image 17 and a distance $L_4$ between the most distant two (171 and 174) of the pixel clusters (171, 172, 173 and 174) of the image 20a. Since the distance $L_1$ is different from the distance $L_4$ and the position of at least one pixel cluster (171 or 173) has not changed or at least one pixel cluster (171 or 173) stays in a predetermined range, the processor generates a rotation gesture.

In another embodiment, the images (17, 20a, and 20b) are generated in sequence. Distances $L_1$, $L_4$ and $L_5$ between the most distant two pixel clusters (171 and 174) are respectively determined from the image (17, 20a, and 20b). The processor 12 may find an increase in distance between the two pixel clusters (171 and 174) by comparing the distance $L_1$ with the distance $L_4$, and find a decrease in distance between two pixel clusters (171 and 174) by comparing the distance $L_4$ with the distance $L_5$. When the processor 12 finds that a distance between the two pixel clusters (171 and 174) increases and then decreases, or decreases and then increases, the processor 12 generates a rotation gesture.

In another embodiment, a plurality of images are generated in sequence. A distance between the most distant two pixel clusters is calculated from each image. When the processor 12 finds out that the distance between the most distant two pixel clusters periodically increases and decreases, the processor 12 generates a rotation gesture.

Figure 14:
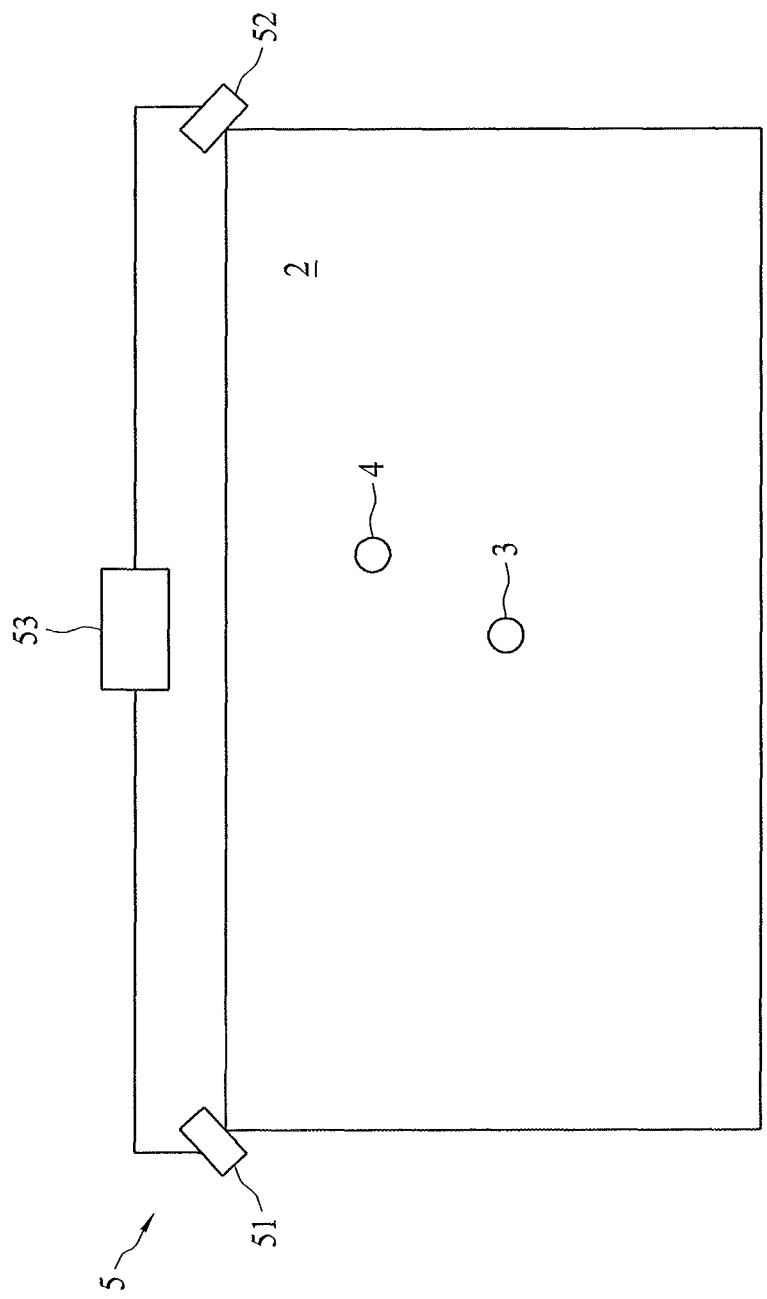
FIG. 14 is an illustration showing an optical touch system according to another embodiment of the present invention.

FIG. 14 is an illustration showing an optical touch system 5 according to another embodiment of the present invention. As shown in FIG. 14, the optical touch system 5 comprises two image sensors (51 and 52) and a processor 53, wherein the two image sensors (51 and 52) are coupled with the processor 53. The two image sensors (51 and 52) are separated beside the touch region 2. Preferably, the two image sensors (51 and 52) are respectively disposed at two corners of the touch region 2. The two image sensors (51 and 52) are configured to detect at least one object (3 or 4) on the touch region 2. The processor 53 is configured to calculate the coordinate data of the object (3 or 4) using the image generated by the two image sensors (51 and 52), or to generate gesture information when finding that the pixel cluster number of an image is greater than a predetermined pixel cluster number.

In one embodiment, the predetermined pixel cluster number of the optical touch system 5 is configured as one.

In one embodiment, in the optical touch system 5, the coordinate data of an object (3 or 4) is determined by both a pixel cluster of one image generated by the image sensor 51 and a pixel cluster of another image to generated by the image sensor 52. The calculation of the coordinate data of an object (3 or 4) needs each image generated by the image sensor (51 or 52) to have one pixel cluster. Therefore, the predetermined pixel cluster of the optical touch system 5 can be determined as one.

Figure 15:
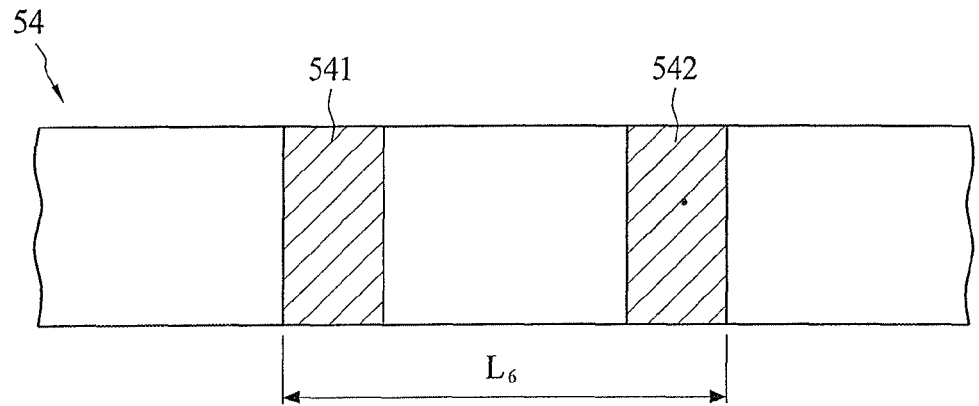
FIG. 15 schematically demonstrates an image with a plurality of pixel clusters formed by the two objects in FIG. 14 according to one embodiment of the present invention.
Figure 16:
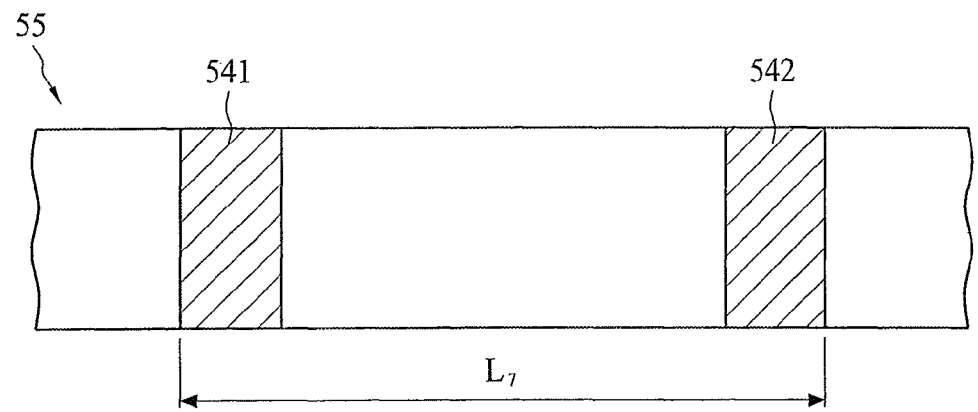
FIG. 16 schematically demonstrates an image with a plurality of pixel clusters formed by the two objects in FIG. 14 that performs a zoom-in gesture according to one embodiment of the present invention.

Referring to FIGS. 14 to 16, when two objects (3 and 4) are on the touch region 2, each image sensor (51 or 52) may generate an image with two pixel clusters (541 and 542). Since the number of pixel clusters of the image 54 is greater than the predetermined pixel cluster number, the processor 53 next determines a change between the image 54 and a next image, and correspondingly generates gesture information. In one embodiment, if the next image comprises one pixel cluster, the processor 53 can determine that one of the objects (3 and 4) moves away from the touch region 2 by comparing the image 54 and a next image, and accordingly generates press and tap gesture information.

Referring to FIGS. 15 and 16, when the number of pixel clusters of the next image 55 is greater than the predetermined pixel cluster number, the processor 53 calculates a distance $L_6$ between two pixel clusters (541 and 542) of the image 54 and a distance $L_7$ between two pixel clusters (541 and 542) of the image 555, and determines a change of the two distances ($L_6$ and $L_7$). If the distance $L_6$ is less than the distance $L_7$, the processor 53 generates zoom-in information; if the distance $L_6$ is less than the distance $L_7$, the processor 53 generates zoom-out information.

Figure 17:
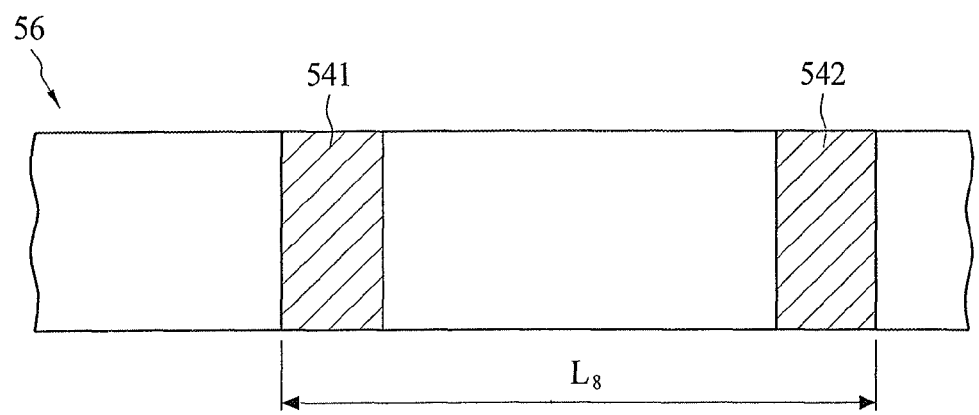
FIG. 17 schematically demonstrates an image with a plurality of pixel clusters formed by the two objects in FIG. 14 that performs a rotation gesture according to one embodiment of the present invention.

Referring to FIGS. 15 and 17, when the next image 55 has the number of pixel clusters greater than the predetermined pixel cluster number, the processor 53 calculates a distance $L_6$ between two pixel clusters (541 and 542) of the image 54 and a distance $L_8$ between two pixel clusters (541 and 542) of the image 555, and determines a change of the two distances ($L_6$ and $L_8$). The processor 53 may further analyze a position change between corresponding pixel clusters (541 or 542) of the images (54 and 56). If the distance $L_6$ is different from the distance $L_8$ and one pixel cluster (541 or 542) has not changed its position in the two images (54 and 56), the processor 53 generates rotation gesture information.

Similarly, when determining that a distance between pixel clusters increases and then decreases, or decreases and then increases in a plurality of images, the processor 53 generates rotation gesture information.

The distance between pixel clusters can be the distance between edges of pixel clusters or the distance between points representing the pixel clusters as described above.

Figure 18:
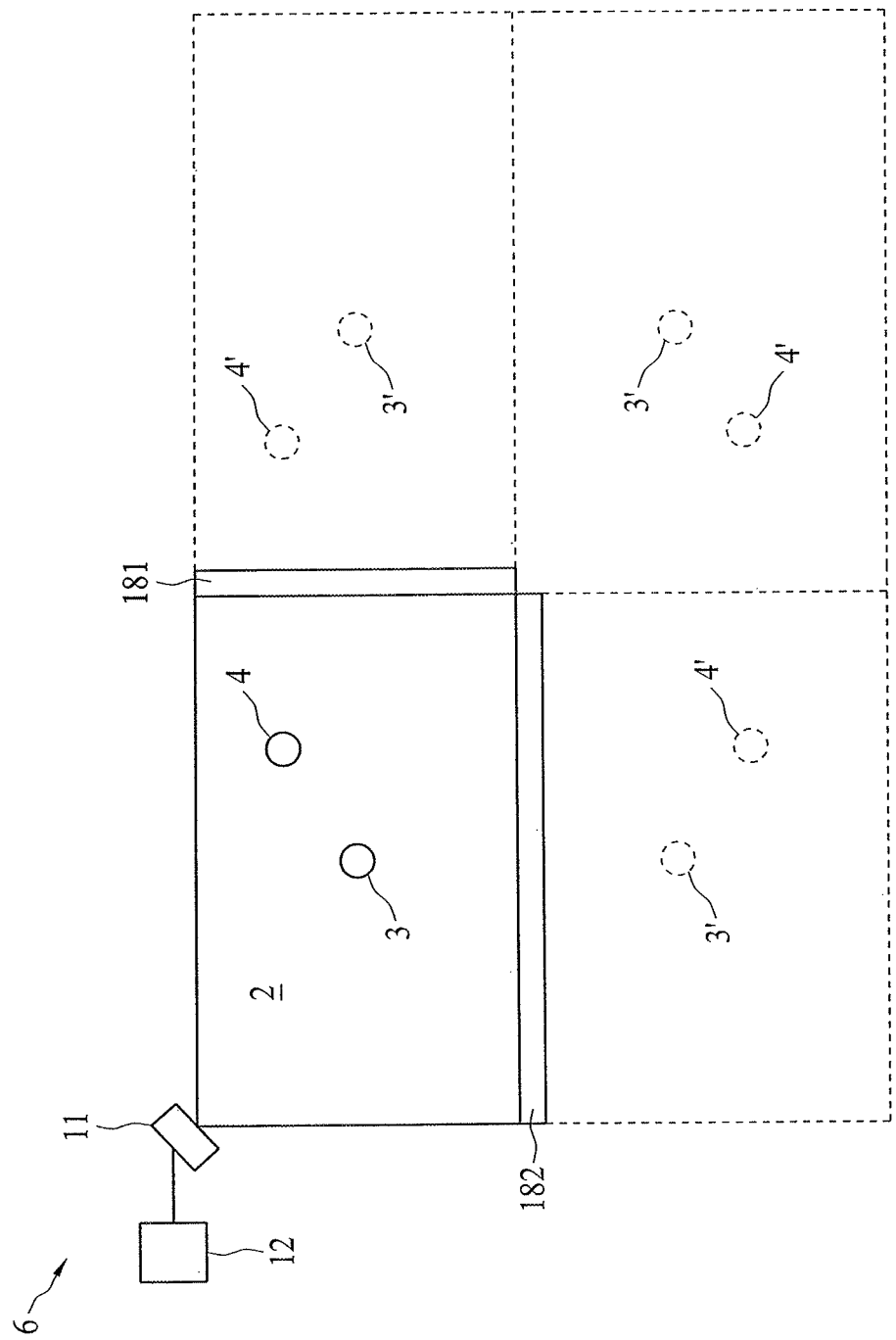
FIG. 18 is an illustration showing an optical touch system according to another embodiment of the present invention.

FIG. 18 is an illustration showing an optical touch system 6 according to one embodiment of the present invention. As shown in FIG. 18, the optical touch system 6 may comprise an image sensor 11, a processor 12, and two mirror members (181 and 182). The two mirror members (181 and 182) are disposed adjacent to a touch region 2, and can be respectively placed besides two adjacent edges of the touch region 2. When the object 3 is on the touch region 2, the two mirror members (181 and 182) generate three reflections 3' of an object 3. Since an image generated by the image sensor 11 can have four pixel clusters, the optical touch system 6 can be configured to have a predetermined pixel cluster number of 4.

Similarly, when the processor 12 determines that the number of pixel clusters is greater than a predetermined pixel cluster number, the processor 12 generates corresponding gesture information according to a next image. In one embodiment, when a next image shows a decrease in the number of pixel clusters, the processor generates press and tap gesture information. When a distance between the most distant two pixel clusters increases in two images, zoom-in information is generated. When a distance between the most distant two pixel clusters decreases in two images, the processor 12 generates zoom-out information. When a distance between the most distant two pixel clusters of one image is different from a distance between the most distant two pixel clusters of another image and the position of at least one pixel cluster has not changed in the two images, the processor generates rotation gesture information. Similarly, when determining that a distance between pixel clusters increases and then decreases, or decreases and then increases in a plurality of images, the processor 12 generates rotation gesture information.

Figure 19:
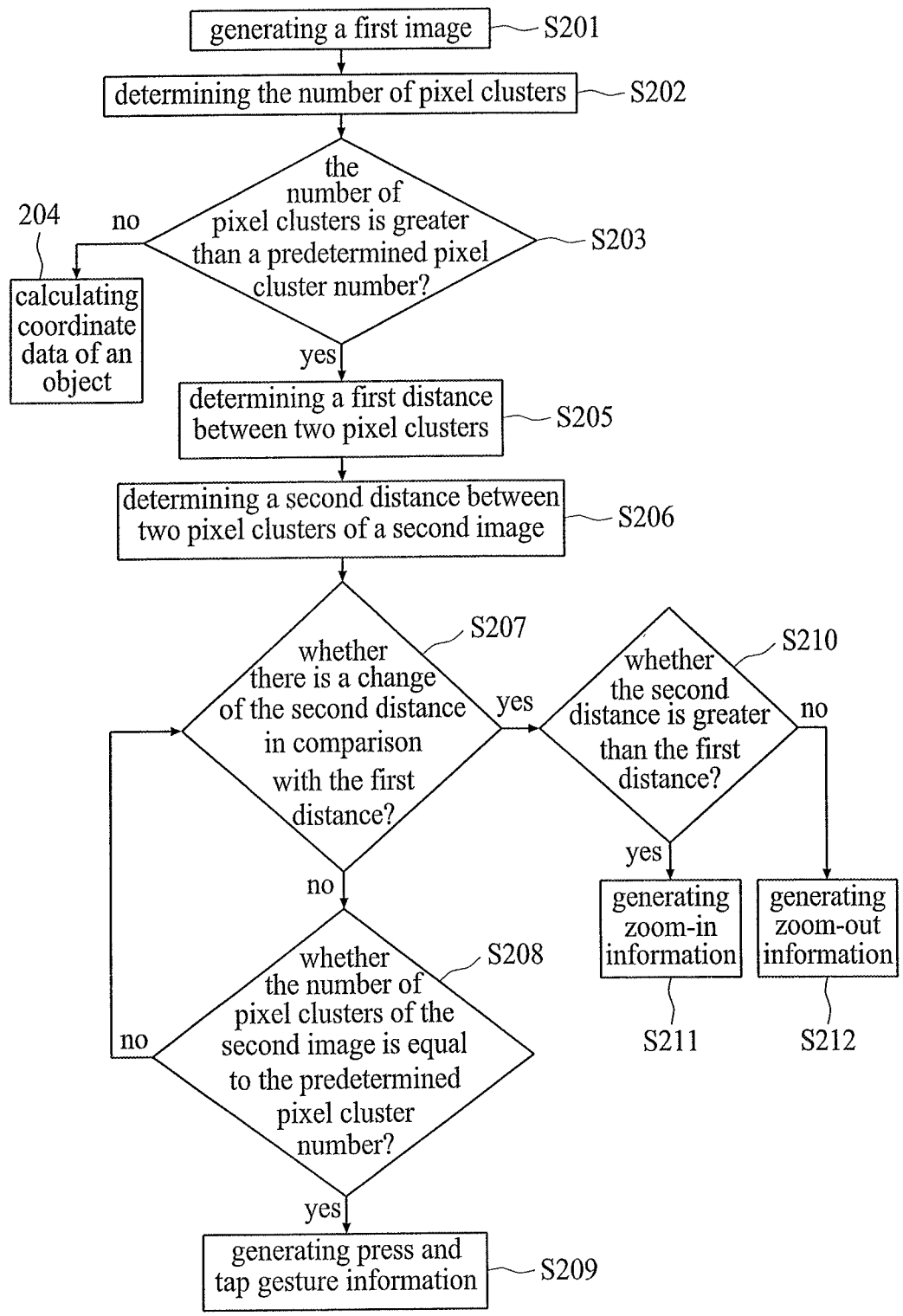
FIG. 19 is a flow chart demonstrating the steps of a method of detecting a gesture according to one embodiment of the present invention.

FIG. 19 is a flow chart demonstrating the steps of a method of detecting a gesture according to one embodiment of the present invention. Referring to FIG. 19, in Step S201, an image sensor generates a first image. In Step S202, the number of pixel clusters of the first image and the locations of the edges of the pixel clusters are determined. In Step S203, it is determined whether the number of pixel clusters of the first image is greater than a predetermined pixel cluster number. In Step S204, when the number of pixel clusters of the first image is not greater than a predetermined pixel cluster number, the coordinate data of the object is calculated. In Step S205, a first distance between the most distant two pixel clusters of the first image is determined. In Step S206, a second image is generated and a second distance between the most distant two pixel clusters of the second image is determined. In Step S207, it is determined whether there is a change of the second distance in comparison with the first distance. In Step S208, it is determined whether the number of pixel clusters of the second image is equal to the predetermined pixel cluster number. In Step S209, when the number of pixel clusters of the second image is equal to the predetermined pixel cluster number, press and tap gesture information is generated. In Step S210, it is determined whether the second distance is greater than the first distance. In Step S211, when the second distance is greater than the first distance, zoom-in information is generated. In Step S212, when the second distance is less than the first distance, zoom-out information is generated.

One embodiment of the present invention discloses using a characteristic of a pixel cluster of an image to determine whether to generate gesture information. Referring to FIGS. 20 and 21, in one embodiment, the image sensor of an optical system can generate a first image 220 (FIG. 20) and a second image 230 (FIG. 21) in sequence. The first image 220 may comprise a plurality of pixel clusters (221 and 222). The second image 230 may comprise a plurality of pixel clusters (221', 222' and 223). A dimension or size $W_1$ represents the pixel cluster 221. A dimension or size $W_2$ represents the pixel cluster 222. A dimension or size $W_1'$ represents the pixel cluster 221'. A dimension or size $W_2'$ represents the pixel cluster 222'. The processor of the optical system may identify the plurality of pixel clusters (221 and 222) of the first image 220 and the plurality of pixel clusters (221', 222' and 223) of the second image 230. The pixel cluster 221 of the first image 220 corresponds to the pixel cluster 221' of the second image 230. The pixel cluster 222 of the first image 220 corresponds to the pixel cluster 222' of the second image 230. In other words, the pixel cluster 221 of the first image 220 and the pixel cluster 221' of the second image 230 may be generated by the same object; the pixel cluster 222 of the first image 220 and the pixel cluster 222' of the second image 230 may be generated by the same object. When the processor finds that the number of pixel clusters of the second image 230 is greater than or equal to the number of pixel clusters of the first image 220 (or a pixel cluster 223 of the second image 230 has no corresponding one in the first image 2220) and a difference between the dimension or size ($W_1$ or $W_2$) of each pixel cluster (221 or 222) and the dimension or size ($W_1'$ or $W_2'$) of each pixel cluster (221' or 222') and/or a difference ($d_1$ or $d_2$) of a position of each pixel cluster (221 or 222) and a position of the corresponding pixel cluster (221' or 222') is less than a threshold, gesture information is generated. In particular, the positional difference can be the difference in edge position, the position of gravity of center, center point position, or a point representing a pixel cluster between corresponding pixel clusters ((221 and 221') or (222 and 222')).

One embodiment of the present invention discloses a method of detecting a gesture and an optical touch system using the same. The method of detecting a gesture can directly generate gesture information according to the change in the number of pixel clusters or the position between images. The step of calculating the coordinate data of an object and then determining the gesture according to the change of the coordinate data is no longer required. The computing time and resource can be reduced, thereby shortening the system response time.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. An optical touch system comprising:
an image sensor configured to detect at least one object; and
a processor coupled with the image sensor, configured to determine a number of pixel clusters created by the at least one object on an image generated by the image sensor, and configured to recognize a gesture mode when the number of pixel clusters is greater than a predetermined pixel cluster number.

2. The optical touch system of claim 1, comprising two image sensors, wherein the predetermined pixel cluster number is one.

3. The optical touch system of claim 1, further comprising a mirror member configured to generate at least one reflection of the at least one object, wherein the predetermined pixel cluster number is two.

4. The optical touch system of claim 1, further comprising two mirror members, each configured to generate at least one reflection of the at least one object, wherein the predetermined pixel cluster number is four.

5. The optical touch system of claim 1, wherein the predetermined pixel cluster number is a number of pixel clusters created by a single object on an image generated by the image sensor.

6. The optical touch system of claim 1, wherein the image comprises a plurality of pixel clusters and the processor is configured to determine a distance between two of the pixel clusters that are farthest apart.

7. The optical touch system of claim 6, wherein the image sensor is configured to generate two images and the processor is configured to determine a distance, from each image, between two of the pixel clusters that are farthest apart and to determine a change between the two distances.

8. The optical touch system of claim 7, wherein the processor is configured to generate zoom-in information when the change between the two distances indicates an increase.

9. The optical touch system of claim 7, wherein the processor is configured to generate zoom-out information when the change between the two distances indicates a decrease.

10. The optical touch system of claim 6, wherein the processor is configured to generate rotation information when the processor determines that there is a difference between the two distances and one of the pixel clusters is at a same position in the two images.

11. The optical touch system of claim 1, wherein the image sensor is configured to generate two images and the processor is configured to generate press and tap gesture information when the processor determines a decrease in the number of pixel clusters of the two images.

12. The optical touch system of claim 1, wherein the processor is configured to use intensity information of at least one portion of pixels of the image to generate an intensity fluctuating pattern and to identify at least one pixel cluster created by the at least one object from the intensity fluctuating pattern.

13. An optical touch system comprising:
an image sensor configured to detect at least one object; and
a processor coupled with the image sensor, configured to determine a number of pixel clusters created by at least one object on an image and to compare the number of pixel clusters with a predetermined pixel cluster number to determine whether to calculate coordinate data or recognize a gesture mode when the number of pixel clusters is greater than the predetermined pixel cluster number.

14. The optical touch system of claim 13, comprising two image sensors, wherein the predetermined pixel cluster number is one.

15. The optical touch system of claim 13, further comprising a mirror member configured to generate at least one reflection of the at least one object, wherein the predetermined pixel cluster number is two.

16. The optical touch system of claim 13, further comprising two mirror members each, configured to generate at least one reflection of the at least one object, wherein the predetermined pixel cluster number is four.

17. The optical touch system of claim 13, wherein the predetermined pixel cluster number is a number of pixel clusters created by a single object on an image generated by the image sensor.

18. The optical touch system of claim 13, wherein the image comprises a plurality of pixel clusters and the processor is configured to determine a distance between two of the pixel clusters that are farthest apart.

19. The optical touch system of claim 18, wherein the image sensor is configured to generate two images and the processor is configured to determine a distance, from each image, between two of the pixel clusters that are farthest apart and to determine a change between the two distances.

20. The optical touch system of claim 19, wherein the processor is configured to generate zoom-in information when the change between the two distances indicates an increase.

21. The optical touch system of claim 19, wherein the processor is configured to generate zoom-out information when the change between the two distances indicates a decrease.

22. The optical touch system of claim 18, wherein the processor is configured to generate rotation information when the processor determines that there is a difference between the two distances and one of the pixel clusters is at a same position in the two images.

23. The optical touch system of claim 13, wherein the image sensor is configured to generate two images and the processor is configured to generate press and tap gesture information when the processor determines a decrease in the number of pixel clusters of the two images.

24. The optical touch system of claim 13, wherein the processor is configured to use intensity information of at least one portion of pixels of the image to generate an intensity fluctuating pattern and to identify at least one pixel cluster created by the at least one object from the intensity fluctuating pattern.

25. An optical touch system comprising:
- an image sensor configured to detect at least one object and generate a plurality of images; and
- a processor configured to receive the images, identify a plurality of pixel clusters of each image, and recognize at least a gesture mode in response to the identified plurality of pixel clusters so as to generate control information according to a change between distances, each determined from a corresponding one of the images, by two of the pixel clusters that are farthest apart.

26. The optical touch system of claim 25, wherein each image is a two-dimensional image and the processor is configured to generate an intensity fluctuating pattern along at least one row and identify the plurality of pixel clusters from the intensity fluctuating pattern.

27. The optical touch system of claim 25, wherein each image is a two-dimensional image and the processor is configured to generate an intensity fluctuating pattern formed by a portion of pixels and identify the plurality of pixel clusters from the intensity fluctuating pattern.

28. The optical touch system of claim 25, wherein when the change of distances indicates an increase, the control information is zoom-in information; when the change of distances indicates a decrease, the control information is zoom-out information.

29. An optical touch system comprising:
- an image sensor configured to detect at least one object and generate a plurality of images; and
- a processor configured to receive the images and identify at least one pixel cluster of each image;
- wherein the processor is configured to recognize at least a gesture mode to thereby generate control information when the processor detects a first pixel cluster of one of the images that stays in a predetermined range in another image, and detects a second pixel cluster in the another image.

30. The optical touch system of claim 29, wherein the processor is configured to generate press and tap gesture information when the second pixel cluster stays in a predetermined range and then disappears.

31. The optical touch system of claim 29, wherein the processor is configured to generate zoom-in information when the first pixel cluster and the second pixel cluster moves away from each other in the images; or the processor is configured to generate zoom-out information when the first pixel cluster and the second pixel cluster move closer to each other.

32. The optical touch system of claim 29, wherein each image is a two-dimensional image, and the processor is configured to generate an intensity fluctuating pattern along at least one row and identify the at least one pixel cluster from the intensity fluctuating pattern.

33. The optical touch system of claim 29, wherein each image is a two-dimensional image, and the processor is configured to generate an intensity fluctuating pattern formed by a portion of pixels and identify the at least one pixel cluster from the intensity fluctuating pattern.

34. An optical touch system comprising:
- an image sensor configured to detect at least one object; and
- a processor configured to identify a plurality of pixel clusters of a first image and a plurality of pixel clusters of a second image, the first image and the second image being generated in sequence, the plurality of pixel clusters of the first image and the plurality of pixel clusters of the second image at least partially corresponding to each other, wherein the processor is configured to recognize a gesture mode when a number of the pixel clusters of the second image is greater than or equal to a number of the pixel clusters of the first image, and a difference between a size of each pixel cluster of the first image and a size of the corresponding pixel cluster of the second image is less than a threshold value and/or a difference between a position of each pixel cluster of the first image and a position of the corresponding pixel cluster of the second image is less than the threshold value.

* * * * *